(12) United States Patent
Payette et al.

(10) Patent No.: US 9,880,820 B2
(45) Date of Patent: Jan. 30, 2018

(54) PROGRAMMING LANGUAGE WITH EXTENSIONS USING DYNAMIC KEYWORDS

(71) Applicant: Microsoft Corporation, Redmond, WA (US)

(72) Inventors: Bruce G. Payette, Bellevue, WA (US); Jason Shirk, Sammamish, WA (US); Xiaoyong Zhou, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/921,144

(22) Filed: Jun. 18, 2013

(65) Prior Publication Data

US 2014/0359586 A1 Dec. 4, 2014

Related U.S. Application Data

(60) Provisional application No. 61/830,127, filed on Jun. 2, 2013.

(51) Int. Cl.
*G06F 9/45* (2006.01)
*G06F 9/44* (2006.01)

(52) U.S. Cl.
CPC ............... *G06F 8/427* (2013.01); *G06F 8/33* (2013.01); *G06F 8/31* (2013.01); *G06F 8/36* (2013.01)

(58) Field of Classification Search
CPC ..... G06F 8/31; G06F 8/41; G06F 8/42; G06F 8/47; G06F 9/44589; G06F 8/427;
(Continued)

(56) References Cited

U.S. PATENT DOCUMENTS 7,958,493 B2 6/2011 Lindsey et al.
8,286,146 B2 * 10/2012 Richmond .................... 717/137
(Continued)

FOREIGN PATENT DOCUMENTS

WO 2009039072 A2 3/2009

OTHER PUBLICATIONS

Mišek, Jakub et al. "Syntactic and Semantic Prediction in Dynamic Languages." 2009. Software Engineering Research, Management and Applications 2009: pp. 59-70.*
(Continued)

*Primary Examiner* — Lewis A Bullock, Jr.
*Assistant Examiner* — Gilles Kepnang
(74) *Attorney, Agent, or Firm* — Fogarty LLP

(57) ABSTRACT

Systems and methods for extending a programming language with a set of extensions using a strict meta-model are disclosed. Embodiments provide a set of interfaces that allow a schema to be synthesized. Syntax is introduced into an existing programming language to allow the construction of schematized data objects. A schema processor module translates a schema representation into new keywords. A document generator module receives the set of keywords and produces output in a selected form. When code comprising the keyword extensions is parsed, AST nodes represent keyword actions as a set of functions and implements those function calls with the original meta-data. A keyword definition comprises a name and an action to be taken at parse time and an action to be taken at runtime. The default action at parse time is to inject a function call into the code. The default action at runtime is to call the function.

13 Claims, 5 Drawing Sheets

(58) Field of Classification Search
CPC .......... G06F 8/51; G06F 17/2705; G06F 8/72; G06F 8/36; G06Q 10/06
USPC .................. 717/106, 127, 136–137, 143–144
See application file for complete search history.

(56) References Cited

U.S. PATENT DOCUMENTS

| | | | | |
|---|---|---|---|---|
| 8,453,126 | B1* | 5/2013 | Ganelin | 717/136 |
| 8,863,097 | B2* | 10/2014 | Thimmel et al. | 717/137 |
| 2004/0194072 | A1* | 9/2004 | Venter | G06F 8/427 717/140 |
| 2007/0055966 | A1* | 3/2007 | Waddington et al. | 717/144 |
| 2007/0150855 | A1* | 6/2007 | Jeong | G06F 8/36 717/106 |
| 2008/0022267 | A1* | 1/2008 | Johnson, Jr. | G06F 8/38 717/143 |
| 2008/0222616 | A1* | 9/2008 | Cheng | G06F 8/51 717/137 |
| 2008/0319957 | A1* | 12/2008 | Muralidhar | G06F 17/30436 |
| 2009/0064091 | A1* | 3/2009 | Tonkin | G06F 8/51 717/104 |
| 2009/0222799 | A1* | 9/2009 | Stewart | G06F 8/72 717/143 |
| 2009/0241094 | A1* | 9/2009 | Sikka et al. | 717/127 |
| 2009/0313613 | A1* | 12/2009 | Ben-Artzi et al. | 717/137 |
| 2010/0088686 | A1* | 4/2010 | Langworthy | G06F 8/41 717/143 |
| 2010/0325620 | A1* | 12/2010 | Rohde | G06F 9/44589 717/154 |
| 2011/0302563 | A1* | 12/2011 | Li | G06F 8/427 717/143 |
| 2012/0065960 | A1* | 3/2012 | Iwama | G06F 17/2705 704/9 |
| 2013/0104100 | A1* | 4/2013 | Mueller | 717/106 |
| 2013/0132929 | A1* | 5/2013 | Weller | G06Q 10/06 717/113 |
| 2013/0159981 | A1* | 6/2013 | Klemenz et al. | 717/143 |
| 2014/0282444 | A1* | 9/2014 | Araya | G06F 8/42 717/143 |

OTHER PUBLICATIONS

"Snippets in Windows PowerShell ISE 3.0", Retrieved on: Jun. 3, 2013, Available at: http://powershell.org/wp/author/powershell-team/page/3/.

Chardon, Alvin, "IntelliSense Support in Visual C++", Published on: Mar. 2005, Available at: http://msdn.microsoft.com/en-us/library/ms379615(v=vs.80).aspx.

Abonyi, et al., "Phalanger Improvements", In Technical Report, Department of Software Engineering, Retrieved on: Jun. 3, 2013, 67 pages.

Khoussainova, et al., "SnipSuggest: ContextAware Autocompletion for SQL", In Proceedings of the VLDB Endowment, vol. 4, Issue 1, Aug. 29, 2011, 12 pages.

Ko, et al., "Barista: An Implementation Framework for Enabling New Tools, Interaction Techniques and Views in Code Editors", In Proceedings of the SIGCHI Conference on Human Factors in Computing Systems, Apr. 22, 2006, 10 pages.

Beno, Maros, "Real-World Refactoring of Dynamic Language Code", In Master's Thesis, May 9, 2013, 75 pages.

Misek, et al., "Mapping of Dynamic Language Constructs into Static Abstract Syntax Trees", In IEEE/ACIS 9th International Conference on Computer and Information Science, Aug. 18, 2010, 6 pages.

\* cited by examiner

PROGRAMMING LANGUAGE WITH EXTENSIONS USING DYNAMIC KEYWORDS

CROSS-REFERENCE TO RELATED APPLICATIONS

This application claims the benefit of the filing date of U.S. Provisional Patent Application No. 61/830,127, which is titled "Intellisense without Needing to Understand New AST Node Types" and was filed on Jun. 2, 2013, the disclosure of which is hereby incorporated by reference herein in its entirety.

BACKGROUND

An abstract syntax tree (AST) is a data structure used in a compiler to represent the structure of program source code. The AST is an abstract representation of the code that shows associations between nodes in a branching structure. Source code is provided to a parser at compile time, which creates an AST corresponding to the source code. The compiler can then recursively walk the AST and generate machine-readable code. When walking the tree, the compiler needs to understand each node type in order to properly generate an output.

The parser must recognize and understand the keywords used in the source code or it will not know how to create the AST nodes for the keywords. Traditionally, extensions to a programming language required that the keywords be hard-coded and defined in the parser to enable it to build the AST. Additionally, the compiler would have to be modified to handle a new keyword in order to generate executable code. Accordingly, existing parsers cannot handle arbitrary keywords. Instead, the parser and compiler have needed to be revised to add new keywords to a language.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide a system and method for updating a parser to allow arbitrary keywords to be dynamically added to the language. These new keywords are bound to a transformation that rewrites the AST to contain default node types only. By rewriting to include only default node types, no changes need to be made to the code generator. However, this results in a loss of information in the AST. So the AST nodes now allow for source keyword metadata to be preserved in the node as a decoration. Making the information available in this form allows tools, such as an Integrated Scripting Environment (ISE), to effectively deal with source representation without needing to understand new AST node types. This is possible because all required information is now available in the decoration.

One embodiment provides the ability to decorate AST nodes with metadata information and thereby define new types of nodes by overloading of functions. Therefore, new compiler constructs do not have to be introduced.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Dynamic keywords allow script writers to import new keyword definitions into a programming language in a way that allows the parser to understand the keywords. The dynamic keywords can be loaded at runtime, and constrained to a region of code, and then unloaded. This may be implemented through a module that defines a set of keywords with associated metadata using a construction or grammar that is understood by the parser. A dynamic keyword is defined declaratively within a module, which also includes a binding between the dynamic keyword and standard functions for the programming language. These standard functions actually implement the behavior at runtime for the dynamic keyword. This information from the module is integrated into the command AST at compile time.

The dynamic keyword module may include code that is executed at compile time to build the nodes required in the AST. This code allows the instruction of custom extensions to the programming language. If this code is not included, then the parser executes a command call and executes the command in the dynamic keyword module. The output of the parser or compiler may be a machine-readable managed object format (MOF) file. Other output formats may be used in other embodiments, including multiple output formats, depending upon the module used to generate the output.

In one embodiment, a configuration automation language or shell, such as Windows PowerShell®, parser may be modified to dynamically add arbitrary keywords to the language. Each dynamic keyword is described by a DynamicKeyword data structure that contains information about the dynamic keyword. The DynamicKeyword data structure contains the following information:

Keyword;

List of properties that are available for the keyword;

Metadata object for the keyword and the body of the keyword; and

Mapping function—the function that will be invoked at execution time.

Any command node AST is modified to contain the following information:

DefiningKeyword, which points to the DynamicKeyword data structure, if the AST was synthesized out of a dynamic keyword; and List of DefinedKeywords, which are additional keywords defined in the child scope.

Intelli-sense as used herein refers to programming tools that assist in reducing errors, such as by providing auto-completion popups, listing allowed parameters of functions, identifying syntax errors, etc. Once the above annotation is added to every command AST node, tools that provide intelli-sense, such as an editor or ISE, need not understand new types of AST. The tools can pick up the required information from the dynamic keyword's metadata and provide intelli-sense support.

Figure 1:
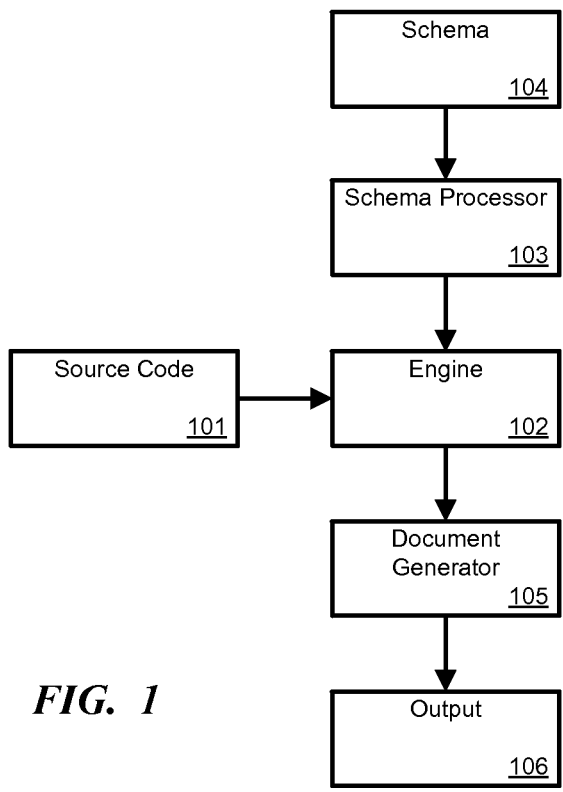
FIG. 1 is a block diagram illustrating processing of source code with dynamic keywords according to one embodiment.

FIG. 1 is a block diagram processing of source code with dynamic keywords according to one embodiment. Source code 101 is processed by the programming language engine or parser 102. A schema processor 103 is loaded by the engine 102. Schema processor 103 takes an instance of the schema 104 that the user has defined. The schema processor translates the schema representation into the dynamic keyword definitions within a particular region.

Engine 102 processes an AST for source code 101 using the schema. Engine 102 then uses a document generator 105 to interpret the AST data and, at runtime, creates a specific output 106. Document generator 105 is a pluggable module that may be selected by the user to generate a desired output format, such as MOF, XML, the host language of the source code, or any other format.

In one embodiment, the dynamic keywords may be limited to prevent users from creating arbitrary extensions to the programming language. Accordingly, there may be highly constrained set of mechanisms for generating extensions.

Figure 2:
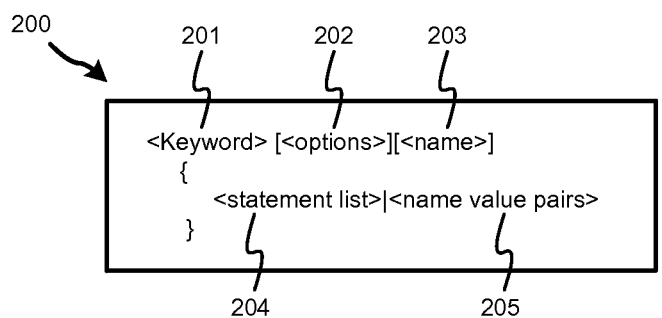
FIG. 2 illustrates a generic schema or meta-model keyword convention for keyword extensions according to one embodiment.

FIG. 2 illustrates a generic schema or keyword convention 200 for keyword extensions according to one embodiment. Schema 200 provides a grammar for keyword extensions in a particular language. Developers use this structure to define extensions to the language. This formatting constrains the type extensions that can be added so that users cannot extend the language in a random way.

Keyword convention 200 requires a unique keyword tag 201. The user may specify zero or more options 202, such as parameters and types. The keyword may have a name 203, which the user may require to be a string or expression. The body comprises either a statement list 204 or a name value pair 205.

Generic schema 200 is a meta-model that defines the format required to form a new dynamic keyword. The meta-model defines the things that are allowed to be expressed in the dynamic keyword model.

Figure 3:
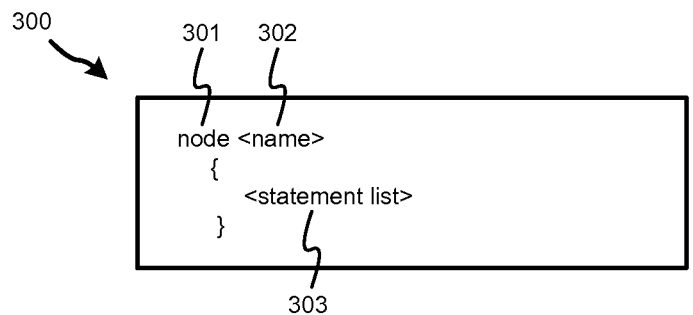
FIG. 3 is an example of a specific schema for an example "node" extension to a programming language.

FIG. 3 is an example of a specific schema 300 for a "node" extension to the programming language. Dynamic keyword "node" creates a domain-specific grammar that is defined using the keyword grammar 200. Once defined, the node dynamic keyword may be used to generate instances of a node resource in the program. The keyword tag is "node" 301, which requires a name 302. The node keyword does not allow any options since field 203 (FIG. 2) is not present. The body of the node dynamic keyword is a statement list 303.

Figure 4:
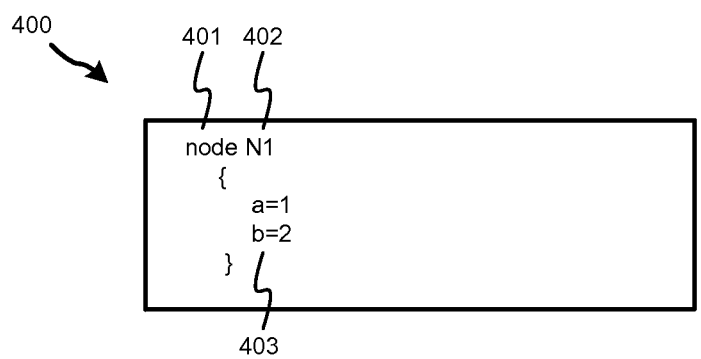
FIG. 4 is an instance of a specific node resource based upon the dynamic keyword definition for node.

FIG. 4 is an instance of a specific node resource 400 based upon the dynamic keyword definition for node 300. The node is named "N1" 401 and includes the statement list "a=1, b=2" 403. The components of node resource 400 evaluate to the required value types of the "node" keyword (300). For example, "N1" 402 must be of type <name> 302, and body 403 must be of type <statement list> 303.

Figure 5:
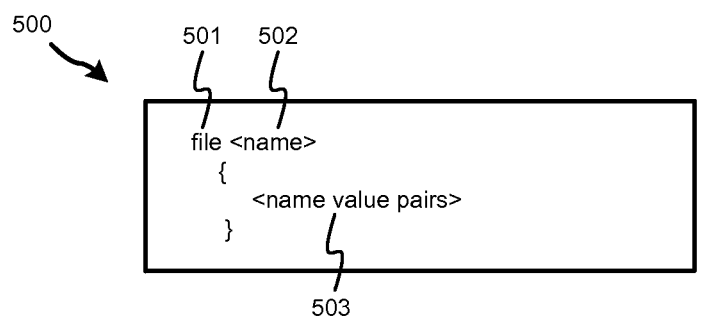
FIG. 5 is an example of a specific schema for an example "file" extension to a programming language.

FIG. 5 is an example of a specific schema for a "file" extension to the programming language. Dynamic keyword "file" 500 that may be used to define a file resource. The keyword tag is "file" 501, which requires a name 502. The body of the file dynamic keyword is a set of name value pairs 503.

Figure 6:
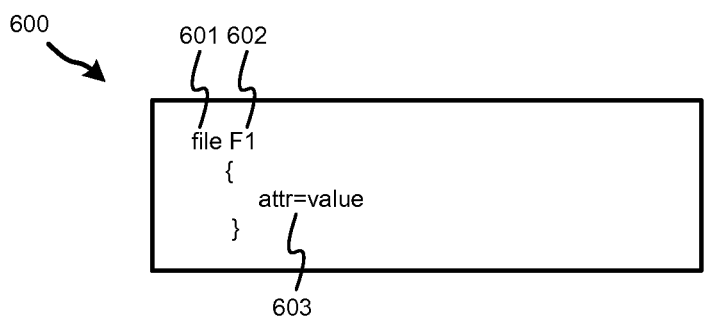
FIG. 6 is an instance of a specific file resource based upon the dynamic keyword definition for file.

FIG. 6 is an instance of a specific file resource 600 based upon the dynamic keyword definition for file 500. The node is named "F1" 601 and includes the name value pairs "a=1, b=2" 603. The components of file resource 600 evaluate to the required value types of the "file" keyword (500). For example, "F1" 602 must be of type <name> 502. Body 603 must be of type <name value pairs> 503 in which the "name" is literally the name and the "value" is any code that evaluates to the defined value type.

The dynamic keywords are defined using a fixed meta-model to define instances of domain-specific grammar. This allows developers to introduce a set of extensions to a programming language, wherein users can create schematized data in a constrained format using the extensions. The meta-model avoids generalized language extensions and provides control over the types of extensions that are allowed. In one embodiment, the extensions are specifically targeted at creating hierarchical data representations that are strongly typed.

The hierarchical data representations can be created at runtime. A schema processor produces the keyword definitions. A document generator or execution processor does data transformation. The schema processor and document generator may be independent, or they may be related, such as using the same format. In one embodiment, both the schema processor and document generator are adapted for MOF; however, by changing the document generator, different types of documents, such as XML, JSON, etc., can be created.

The implementations of the schema processor and document generator may be written in the host language so that the user does not require special access to language internals. This would allow users to write a script in the same language that is being extended.

Using the meta-model, intelli-sense is able to provide a list of the legal types and values when a user is scripting a specific instance of a dynamic keyword. Using the meta-model, intelli-sense understands the syntax extensions that are being used and, within a given block, is also aware of the particular resources that have been defined in that block.

The syntax extensions may be added without defining a new AST node. As a result, existing tools and editors will work with these extensions because no new nodes are being introduced to the AST.

Instead of recording new keywords or introducing new keyword node types, the meta-model overloads the AST command node to have an extra property that identifies the name of the keyword that it came from. The node that the keyword came from is encoded along with the set of keyword definitions that are allowed inside the node.

Figure 7:
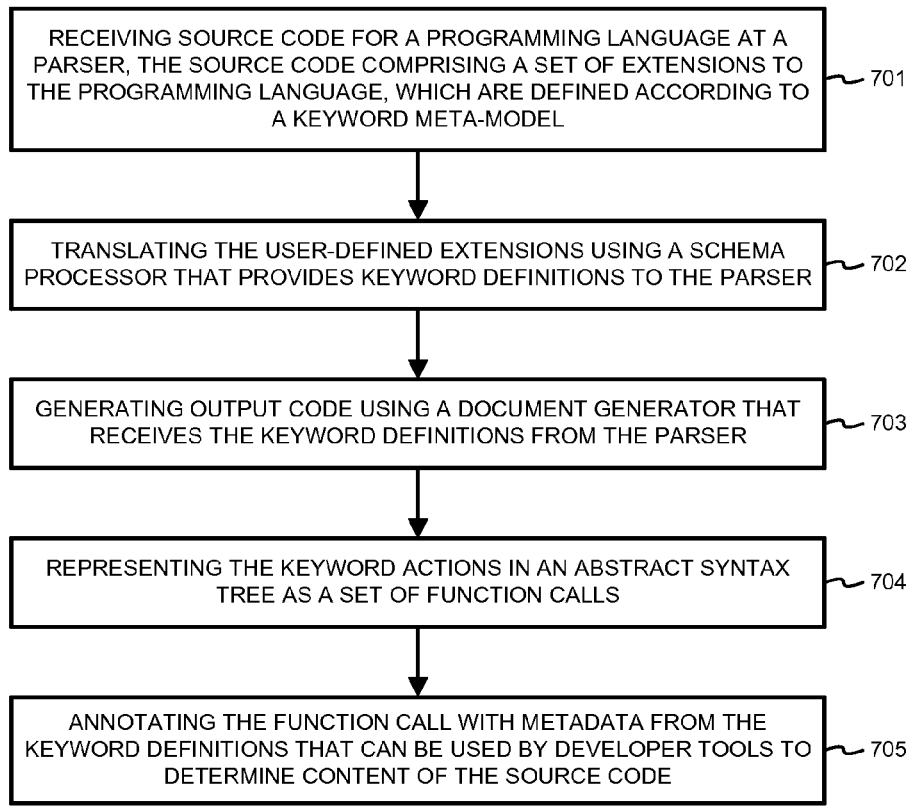
FIG. 7 is a flowchart illustrating a method or process for extending a programming language using a keyword meta-model.

FIG. 7 is a flowchart illustrating a method or process for extending a programming language using a keyword meta-model. In step 701, source code for a programming language is received at a parser. The source code comprises a set of extensions to the programming language. The extensions are defined by a user according to a keyword meta-model. The keyword meta-model comprises a keyword name and an action. The action comprises an action to be taken at parse time, such as creating a function call to a function having the name of the keyword, and an action to be taken at runtime, such as calling the function.

In step 702, the user-defined extensions are translated using a schema processor that provides keyword definitions to the parser. A schema representation is translated using the meta-model into new keywords by the schema processor.

In step 703, output code is generated using a document generator that receives the keyword definitions from the parser. The document generator is an independent module that produces output in a desired format using the set of keywords.

In step 704, keyword actions are represented in an abstract syntax tree as a set of functions calls. In step 705, the function calls are annotated with metadata from the keyword definitions that can be used by developer tools to determine content of the source code.

Figure 8:
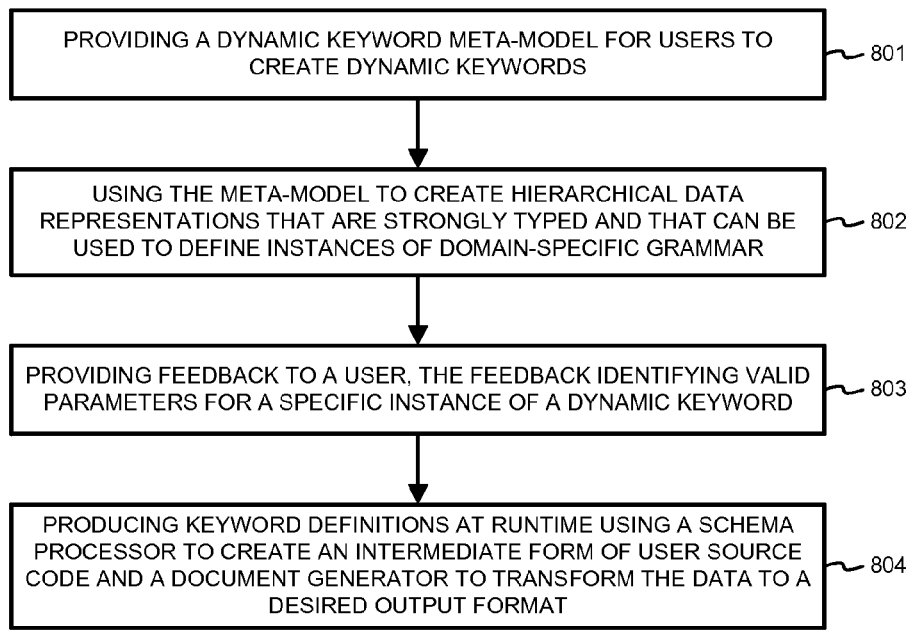
FIG. 8 is a flowchart illustrating a method or process for creating dynamic keywords.

FIG. 8 is a flowchart illustrating a method or process for creating dynamic keywords. In step 801, a dynamic keyword meta-model is provided for users to create the dynamic keywords. In step 802, the meta-model is used to create hierarchical data representations that are strongly typed and that can be used to define instances of domain-specific grammar. The hierarchical data representations comprise schematized data in a constrained format. In step 803, feedback is provided to a user. The feedback identifying valid parameters for a specific instance of a dynamic keyword.

In step 804, keyword definitions are produced at runtime using a schema processor to create an intermediate form of user source code and a document generator to transform the data to a desired output format. The schema processor and document generator are selected to allow users to write extensions to the programming language in the programming language itself.

Figure 9:
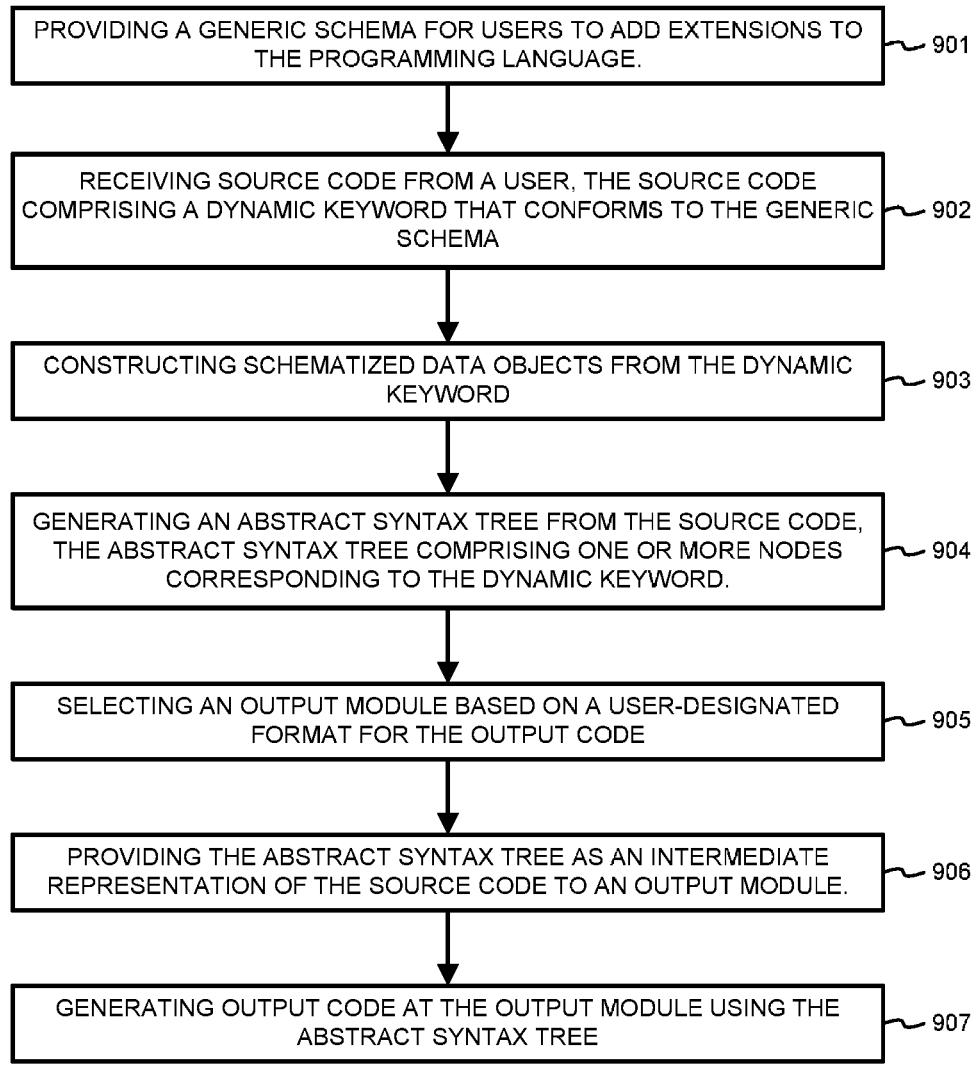
FIG. 9 is flowchart illustrating a method or process for extending a programming language using dynamic keywords.

FIG. 9 is flowchart illustrating a method or process for extending a programming language using dynamic keywords. In step 901, a generic schema is provided for users to add extensions to the programming language. In step 902, source code is received from a user. The source code comprises a dynamic keyword that conforms to the generic schema. The dynamic keyword provides a grammar to be used when invoking instances of the dynamic keyword.

In step 903, schematized data objects are constructed from the dynamic keyword. In step 904, an abstract syntax tree is generated from the source code. The abstract syntax tree comprises one or more nodes corresponding to the dynamic keyword. The nodes comprise metadata from the dynamic keyword.

In step 905, the output module is selected based upon a user-designated format for the output code. In step 906, the abstract syntax tree is provided as an intermediate representation of the source code to an output module. In step 907, the output code is generated at the output module using the AST. The types defined in instances of the dynamic keyword are checked at parse-time. The dynamic keyword are mapped to a function in the programming language to implement the dynamic keyword behavior at runtime.

Figure 10:
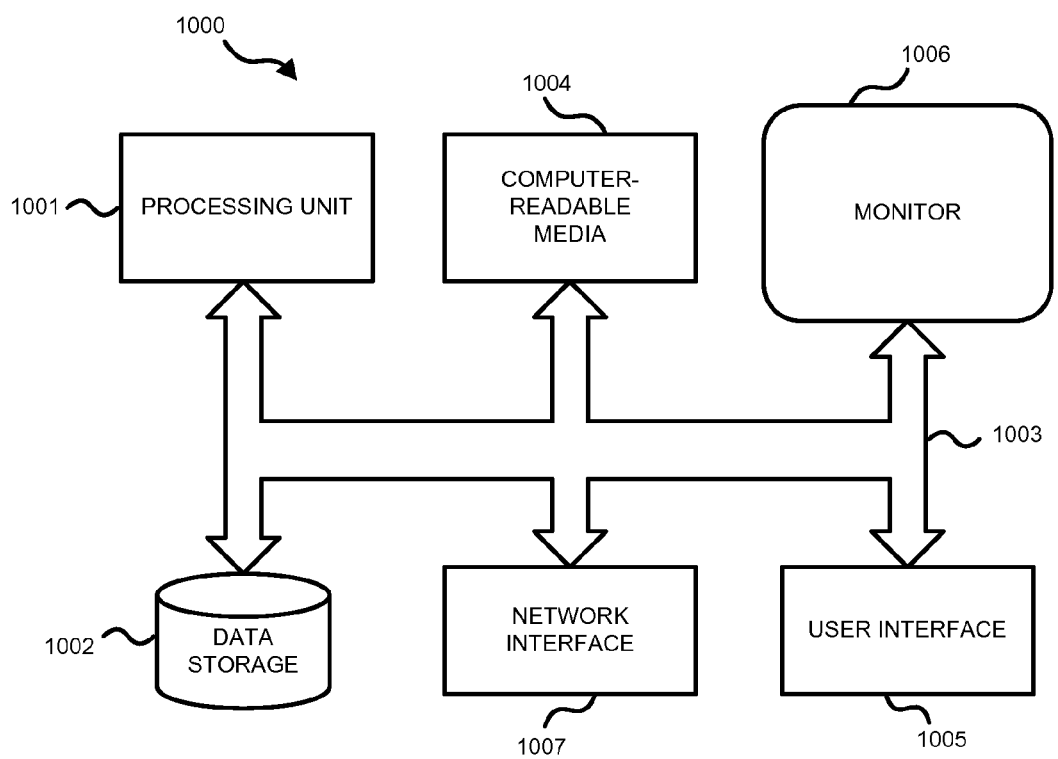
FIG. 10 illustrates an example of a suitable computing and networking environment for providing programming language extensions using a highly constrained meta-model.

FIG. 10 illustrates an example of a suitable computing and networking environment 1000 on which the examples of FIGS. 1-9 may be implemented. The computing system environment 1000 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1000. Components may include, but are not limited to, various hardware components, such as processing unit 1001, data storage 1002, such as a system memory, and system bus 1003 that couples various system components including the data storage 1002 to the processing unit 1001. The system bus 1003 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1000 typically includes a variety of computer-readable media 1004. Computer-readable media 1004 may be any available media that can be accessed by the computer 1000 and includes both volatile and nonvolatile media, and removable and non-removable media, but excludes propagated signals. By way of example, and not limitation, computer-readable media 1004 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1000. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 1002 includes computer storage media in the form of volatile and/or nonvolatile memory such as read only memory (ROM) and random access memory (RAM). A basic input/output system (BIOS), containing the basic routines that help to transfer information between elements within computer 1000, such as during start-up, is typically stored in ROM. RAM typically contains data and/or program modules that are immediately accessible to and/or presently being operated on by processing unit 1001. By way of example, and not limitation, data storage 1002 holds an operating system, application programs, and other program modules and program data.

Data storage 1002 may also include other removable/non-removable, volatile/nonvolatile computer storage media. By way of example only, data storage 1002 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 10, provide storage of computer-readable instructions, data structures, program modules and other data for the computer 1000.

A user may enter commands and information through a user interface 1005 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 1001 through a user input interface 1005 that is coupled to the system bus 1003, but may be connected by other interface and bus structures, such as a parallel port, game port or a universal serial bus (USB). A monitor 1006 or other type of display device is also connected to the system bus 1003 via an interface, such as a video interface. The monitor 1006 may also be integrated with a touch-screen panel or the like. Note that the monitor and/or touch screen panel can be physically coupled to a housing in which the computing device 1000 is incorporated, such as in a tablet-type personal computer. In addition, computers such as the computing device 1000 may also include other peripheral output devices such as speakers and printer, which may be connected through an output peripheral interface or the like.

The computer 1000 may operate in a networked or cloud-computing environment using logical connections 1007 to one or more remote devices, such as a remote computer. The remote computer may be a personal computer, a server, a router, a network PC, a peer device or other common network node, and typically includes many or all of the elements described above relative to the computer 1000. The logical connections depicted in FIG. 10 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 1000 may be connected to a public or private network through a network interface or adapter 1007. In some embodiments, a modem or other means for establishing communications over the network. The modem, which may be internal or external, may be connected to the system bus 1003 via the network interface 1007 or other appropriate mechanism. A wireless networking component such as comprising an interface and antenna may be coupled through a suitable device such as an access point or peer computer to a network. In a networked environment, program modules depicted relative to the computer 1000, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
based on input from a user, translating a generic schema into a specific schema based on a meta-model for a programming language, wherein the programming language has a constrained number of keywords defined for a parser that are extended to incorporate user-defined keyword extensions and the meta-model defines the format and limits of the types of user-defined keyword extensions;
receiving source code for the programming language at the parser, wherein the source code comprises a user-defined keyword extension to the programming language, and the user-defined keyword extension is based on a specific schema;
based on the specific schema, translating the user-defined keyword extension, using a schema processor, into keyword definitions for the parser, wherein the translating further comprises generating dynamic keyword data structures associated with the user-defined keyword detailing metadata of the user-defined keyword extension, and one or more keyword actions for performing the user-defined keyword extension;
creating, by the parser, an abstract syntax tree (AST), wherein each command node of the AST associated with the user-defined keyword extension is overloaded to contain: (i) information pointing to the dynamic keyword data structure, and (ii) additional keywords defined in a child scope of the command node;
providing the AST to a document generator as an intermediate representation of the source code; and
generating output code based on the AST, by the document generator, wherein the generating uses a set of one or more calls to the one or more keyword actions for the command nodes associated with the user-defined keyword extensions.

2. The method of claim 1, further comprising:
translating a schema representation using the meta-model into new keywords by the schema processor.

3. The method of claim 1, wherein the document generator is an independent module that produces output in a desired format.

4. The method of claim 1, wherein the meta-model includes a first action to be taken at parse time, wherein the first action comprises creating, at parse time, a call to a routine having a keyword name.

5. The method of claim 4, wherein the meta-model includes a second action to be taken at runtime, wherein the second action further comprises invoking the one or more calls at runtime.

6. A memory device having stored thereon computer-executable instructions that, upon execution by a processor of a computing system, configure the computer system to:
based on input from a user, translate a generic schema into a specific schema based on a meta-model for a programming language, wherein the programming language has a constrained number of keywords defined for a parser that are extended to incorporate user-defined keyword extensions and the meta-model defines the format and limits of the types of user-defined keyword extensions;
receive source code for the programming language at the parser, wherein the source code comprises a user-defined keyword extension to the programming language, and the user-defined keyword extension is based on the specific schema;
based on the specific schema, translate the user-defined keyword extension, using a schema processor, into keyword definitions for the parser, wherein the translating further comprises generating dynamic keyword data structures associated with the user-defined keyword detailing metadata of the user-defined keyword extension, and one or more keyword actions for performing the user-defined keyword extension;
creating, by the parser, an abstract syntax tree (AST), wherein each command node of the AST associated with the user-defined keyword extension is overloaded to contain: (i) information pointing to the dynamic keyword data structure, and (ii) additional keywords defined in a child scope of the command node;
providing the AST to a document generator as an intermediate representation of the source code; and
generating output code based on the AST, by the document generator, wherein the generating uses a set of one or more calls to the one or more keyword actions for the command nodes associated with the user-defined keyword extension.

7. The memory device of claim 6, wherein the computer-executable instructions, upon execution by the processor further configure the computer system to:
provide the AST as an intermediate representation of the source code to an output module; and
generate output code at the output module using the AST.

8. The memory device of claim 7, further comprising:
select the output module based upon a user-designated format for the output code.

9. The memory device of claim 6, wherein the computer-executable instructions, upon execution by the processor further configure the computer system to:
check types defined in instances of the given user-defined keyword extension at parse-time; and
map the given user-defined keyword extension to a command or statement in the programming language to implement a keyword behavior at runtime.

10. A computer system, comprising:
a processor; and
a memory coupled to the processor, the memory having program instructions stored thereon that, upon execution by the processor, configure the computer system to:
based on input from a user, translate a generic schema into a specific schema based on a meta-model for a programming language, wherein the programming language has a constrained number of keywords defined for a parser that are extended to incorporate user-defined keyword extensions and the meta-model defines the format and limits of the types of user-defined keyword extensions;
receive source code for the programming language at the parser, wherein the source code comprises a user-defined keyword extension to the programming language, and the user-defined keyword extension is based on the specific schema;
based on the specific schema, translate the user-defined keyword extension, using a schema processor, into keyword definitions for the parser, wherein the translating further comprises generating dynamic keyword data structures associated with the user-defined keyword detailing metadata of the user-defined keyword extension, and one or more keyword actions for performing the user-defined keyword extension;
creating, by the parser, an abstract syntax tree (AST), wherein each command node of the AST associated with the user-defined keyword extension is overloaded to contain: (i) information pointing to the dynamic keyword data structure, and (ii) additional keywords defined in a child scope of the command node;
providing the AST to a document generator as an intermediate representation of the source code; and
generating output code based on the AST, by the document generator, wherein the generating uses a set of one or more calls to the one or more keyword actions for the command nodes associated with the user-defined keyword extension.

11. The computer system of claim 10, wherein hierarchical data representations comprise schematized data in a constrained format.

12. The computer system of claim 10, wherein the program instructions, upon execution by the processor, further configure the computer system to transform the output code to a desired format.

13. The computer system of claim 10, wherein the program instructions, upon execution by the processor, further configure the computer system to provide feedback to the user, the feedback identifying valid parameters for a specific instance of the user-defined keyword extension.

* * * * *